Dec. 31, 1957            A. KURTI            2,818,281
MEANS PROVIDING A GAS TIGHT JOINT FOR SHEET METAL PIPES
Filed March 31, 1954
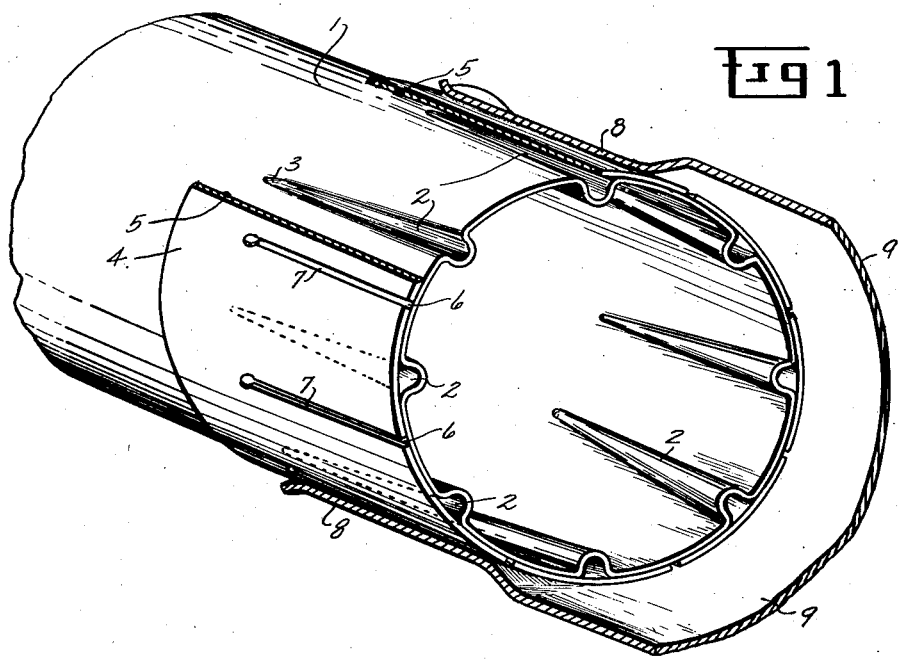
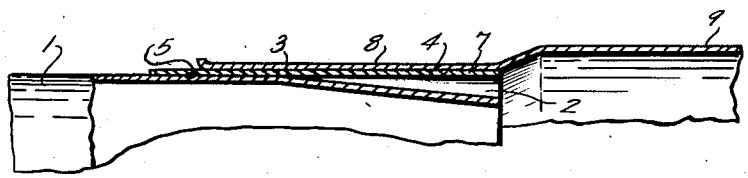
INVENTOR.
ALEXANDER KURTI

United States Patent Office 2,818,281
Patented Dec. 31, 1957

2,818,281

MEANS PROVIDING A GAS TIGHT JOINT FOR SHEET METAL PIPES

Alexander Kurti, North Woodbury, Conn., assignor, by mesne assignments, to the United States of America as represented by the Secretary of the Air Force Application March 31, 1954, Serial No. 420,217

1 Claim. (Cl. 285—399)

This invention relates to a novel modification of cylindrical sheets so as to enable an improved flexible sealed joint between sections thereof to provide piping systems having flexible expansible joints therein which will maintain a sealed relation through varying temperature conditions.

Heretofore there have been many problems occurring in the use of thin gauge sheet metal piping wherein gas tight joints are necessary. There is always the problem of axial displacement of the connecting pipe sections relative to each other as well as the problem of thermal expansion and contraction. This requires not only a looseness in joints when cold but also there is still the requirement of a continuous seal between the connecting sections of the thin gauge cylindrical sheets which must be maintained through a wide temperature range. Prior to this invention slotting one of the connecting cylindrical sheets has been employed to accommodate expansion and contraction in the joint but from experience it has been found that this makes the slotted section inherently weak and flimsy so as to be easily damaged on handling and also the slots permit leaks in use due to relative movement between the joint elements as they are subjected to expansion and contraction under the varying conditions of use.

The subject invention results in a joint for thin gauge sheet metal piping which is continuously gas tight yet flexible throughout the range of temperature and use conditions to which it is subjected. In the modification of a pipe section to effect the novel improved joint, one end of a cylindrical sheet section is corrugated to a predetermined depth longitudinally of the section. A thin sealing strip is placed circumferentially about the section and is secured adjacent the inner end of the corrugated portion of the section. This sealing section is coextensive with the corrugated end portion and is slotted longitudinally in spaced relation. The sealing strip is so assembled that the slots on the sealing strip are in staggered relationship with the grooves resulting in the pipe section from the corrugations.

An object of the invention is to provide an improved gas tight, flexible pipe joint.

A further object of the invention is to provide a novel modified thin gauge sheet metal pipe section such as will enable an improved pipe joint.

Another object of the invention is to provide an improved expansion joint for tubular structures.

An additional object of the invention is to provide an improved pipe section which will enable an expansion joint which will maintain a continuous gas tight seal under widely varying temperature conditions.

Other objects and advantages of the invention will become readily apparent to those versed in the art from the following description taken in conjunction with the accompanying drawings wherein:

Fig. 1 is a view of the joint portion of an improved cylindrical sheet pipe section showing the novel structure of the subject invention.

Fig. 2 shows a cross sectional view of the improved expansion joint resulting from the employment of subject invention.

The apparatus constituting the subject invention may be readily determined with reference to the drawings. The cylindrical sheet section 1 is corrugated at one end to provide grooves 2, substantially triangular in shape, longitudinally thereof extending rearwardly from the end of the section and tapering to an apex 3 as shown in Fig. 1 of the drawings. A metal sealing strip or collar 4 arranged circumferentially about the pipe section 1 is secured at one end 5, as by welding, to the pipe section 1 on a circular seam line which is rearwardly of the apex of each groove therein. The sealing strip extends coextensively with the grooved end of the pipe section 1 to overlie the grooves therein along their entire length. The sealing strip is slotted inwardly of its other end 6 to form spaced slots 7 therein. The slots 7 are arranged in the sealing strip 4 in circumferentially staggered positions relative to the grooves 2. Thus the grooves are continuously covered by solid, smooth cylindrical sections, of the sealing strip, intermediate the slots 7 in the sealing strip. The opposite or connecting end portion 8 of the joining pipe section 9 is continuous in nature to frictionally engage the pipe section 1 about the sealing strip as shown in Fig. 2 of the drawings. The cross section of the joining pipe section 8 may be of any desired design such as will slip over the sealing strip 4 on section 1 in clamping relation thereto. The suggested end cross section for the joining end of pipe section 9 shown in Fig. 2 of the drawings shows the pipe section end of reduced diameter in its gripping portion 8 and flared outwardly at the end to facilitate the slipping of pipe section 9 over the sealing strip on pipe section 1. Thus as the pipe section 9 slips on the sealing strip 4 in clamping relation thereto completely enclosing the slots 7, the clamping portion 8 presses the strip 4 down about the corrugations, with the slots 7 centered on the raised portions of pipe section 1 between the grooves 2. Accordingly the grooves 2 are gas tight and the expansion slots 7 are sealed between the clamping portion 8 of pipe section 9 and the raised portions between the grooves 2 in pipe section 1. This results in a highly effective expansion joint. The corrugations in pipe section 1 permit radial expansion and contraction thereof at its joining end whereas the sealing strip which is slotted for radial expansion and contraction continuously closes the grooves 2 to prevent gas leakage therethrough and accommodates the radial expansion and contraction of pipe section 1 at the same time. The pressure of gas flow through the pipe tends to expand the pipe section 1 and sealing strip 4 into enhanced gas tight relationship with pipe section 9. The structural formation of the joint so formed permits also a more even distribution of applied stress and strain on the pipe joint as is readily apparent from the invention structure to minimize buckling or tearing of the pipe sections at the joint. Also on reduction of gas flow the sealing strip 4 will maintain the sealing engagement with pipe section 9.

It is noted that the sealing strip 4 may be formed of separate sections arranged adjacent each other about the pipe section 1 to provide slots therebetween but such is not the preferred form of the sealing strip.

Thus throughout use conditions the novel gas tight joint as described will continuously and readily provide an effective seal within a wide range of use by its sturdy construction.

While a single practical embodiment of the invention has been shown and described herein, many modifica-

What is claimed is:

A gas tight sealing joint between inner and outer pipes composed of substantially the same material, comprising a cylindrical end part on the inner pipe corrugated lengthwise to provide circumferentially spaced grooves and smooth semicylindrical sections between the grooves, a cylindrical sealing band of substantially the same material as the pipes, snugly fitting and girding said end part and fixed throughout its circumference to said end part along a circumferential seam line beyond the rear ends of the grooves, said band being formed with an uninterrupted circumferential portion at the seam line and with lengthwise extending slots forward of the seam line and arranged in circumferentially staggered relation to the grooves, leaving smooth semicylindrical sections of the band between the slots to cover the grooves and seal them against gas escape, while the smooth semicylindrical sections of said end pipe part close the bottom of the slots in the sealing band, said grooves and slots accommodating radial expansion and contraction of said pipe part and the sealing band, a smooth cylindrical end section on the outer pipe in clamping engagement with said sealing band and extending in snug telescoping relation with said band to a point beyond the rearward end of said slots to close the slots against gas escape.

References Cited in the file of this patent
UNITED STATES PATENTS

| | | |
|---|---|---|
| 1,057,146 | Hammack | Mar. 25, 1913 |
| 1,315,904 | Bever | Sept. 9, 1919 |
| 1,854,515 | Jackes | Apr. 19, 1932 |
| 2,099,984 | Lundquist | Nov. 23, 1937 |
| 2,183,296 | Marx | Dec. 12, 1939 |
| 2,396,086 | Conaway | Mar. 5, 1946 |
| 2,494,659 | Huyton | Jan. 17, 1950 |